United States Patent
Nielsen et al.

[11] Patent Number: 5,996,967
[45] Date of Patent: Dec. 7, 1999

[54] HYDRAULIC VALVE

[75] Inventors: Helge B. Nielsen, Sydals; Hans Christian Sand, Sønderborg, both of Denmark

[73] Assignee: Danfoss A/S, Nordborg, Denmark

[21] Appl. No.: 09/185,358

[22] Filed: Nov. 3, 1998

[30] Foreign Application Priority Data

Nov. 3, 1997 [DE] Germany ............................ 197 48 344

[51] Int. Cl.⁶ .................................................. F16K 27/00
[52] U.S. Cl. ............................................. 251/367; 251/358
[58] Field of Search ..................................... 251/358, 367; 137/625.65, 625.67, 625.68

[56] References Cited

U.S. PATENT DOCUMENTS 3,506,239  4/1970  Johnson ............................... 251/367 X
3,526,386  9/1970  Gachot ................................ 251/358 X
4,993,684  2/1991  Prima .................................. 251/357

*Primary Examiner*—John Fox
*Attorney, Agent, or Firm*—Lee, Mann, Smith, McWilliams, Sweeney & Ohlson

[57] ABSTRACT

A hydraulic valve with a housing, which is made of a plastic material, and with at least two fluid connections and a valve element arranged movably in the housing. A valve of this kind must on the one hand be able to withstand a sufficient pressure and on the other hand the production of the valve must be inexpensive. For this purpose the housing is surrounded by a metal sheet enclosure having at each fluid connection an opening, which is surrounded by a metal sheet wall projecting from and connected with the metal sheet enclosure.

14 Claims, 2 Drawing Sheets

HYDRAULIC VALVE

BACKGROUND OF THE INVENTION

The invention concerns a hydraulic valve with a housing, which is made of plastic, and with at least two fluid connections and a valve element arranged to be movable in the housing.

A hydraulic valve of this kind is known from U.S. Pat. No. 5,551,482. This valve is made as a slide valve. The valve element is a slide arranged to be axially movable in a bushing, which again is built into the plastic housing. Parallel to the axial direction of the bushing the plastic housing is divided in two. The two parts can be joined together by means of an ultrasonic welding.

Hydraulic valves of this kind are used for many different purposes. Thus, they are practically mass-products, which should be manufactured at the lowest possible costs.

In connection with mass production, plastic is very suited for the housing. The housing can then be made by injection moulding, which permits the production of large numbers at a high accuracy.

The disadvantage of a plastic housing is, however, that it can only be exposed to a very limited pressure.

SUMMARY OF THE INVENTION

It is the purpose of the invention to propose a valve, which can be exposed to a sufficient pressure, the production is still inexpensive.

In a hydraulic valve as mentioned in the introduction, this task is solved in that the housing is surrounded by a metal sheet enclosure having at each fluid connection an opening, which is surrounded by a metal sheet wall projecting from and connected with the metal sheet enclosure.

This embodiment provides a substantial improvement of the pressure stability of the valve in a simple and inexpensive way. The housing is kept together from the outside by the metal sheet enclosure. Pressure stresses inside the valve can therefore no longer cause an illegal expansion or damaging of the housing. Thus, a valve of this kind can also handle fluids, when they are under a high pressure. However, it is relatively difficult to connect a fluid pipe to the metal sheet enclosure in a way that the connection is as pressure resistant as the valve itself. Neither the metal sheet enclosure, which has only a small wall thickness, nor the plastic of the housing, are normally able to accommodate a fixing means, which is able to resist the forces produced by the high hydraulic pressure. It can often be observed that the fixing means, for example a thread, is torn out. When, however, the metal sheet enclosure is provided with a metal sheet wall at each opening, which wall surrounds the opening, a sufficient length of the wall can be provided to give the connections the required stability.

Preferably, the metal sheet wall and the metal sheet enclosure are made in one piece. A one-piece embodiment is a high-tensile connection, so that the combination of metal sheet wall and metal sheet enclosure has practically the same stability as the metal sheet enclosure itself.

In this connection it is particularly preferred that the metal sheet wall is bent out from the metal sheet enclosure. When making the opening in the metal sheet enclosure, material must normally be removed from the metal sheet enclosure, for example by boring or stamping. Now part of this material can be left, that is, not removed but bent, for example by a drawing process, to produce the metal sheet wall. Then the metal sheet wall is in fact made in one piece with the metal sheet enclosure without requiring an additional connection process, for example welding. Under certain circumstances the thread can also be made during the drawing process. It is also possible, however, to make the thread later. The term "bent" does not necessarily mean that the metal sheet wall projects radially outwards from the metal sheet enclosure, even though this is a preferred embodiment.

Preferably, the metal sheet wall is vertical to the opening. As the metal sheet wall is provided with connection parts for the connection, the connection parts should also have a cylindrical external or internal wall to be connectable with the metal sheet wall. This s implifies the production. Also, an easily realisable tightness can be reached. The connection can, for example, be made by welding, soldering, bonding etc., which would provide the required connection length in connection with a cylindrically shaped metal sheet wall.

Preferably, the metal sheet wall has a thread. Thus, connection parts can be fixed on the metal sheet enclosure by means of a threaded connection. For this purpose the metal sheet wall provides a sufficient thread length, which goes far beyond the length which would be obtained when only the metal sheet thickness of the metal sheet enclosure was used. A thread is easily made. It can for instance be cut into the metal sheet wall, or be impressed into the metal sheet wall already during the drawing.

Advantageously, the thread is made as an internal thread. The metal sheet enclosure surrounding the metal sheet wall radially from the outside at least at its bottom part, gives the metal sheet wall a certain support radially from the outside, so that the threaded connection has the required stability.

Advantageously, a connecting piece is connected with the metal sheet wall, which connecting piece is sealed direct with the plastic of the housing. The sealing towards the plastic is often easier than the sealing in a thread. As, anyway, the metal sheet enclosure is meant for increasing the pressure stability of the housing, but not for providing a fluid sealing, the direct sealing between the connecting piece and the housing is obvious. Additionally, it prevents fluid from reaching the area between the metal sheet enclosure and the housing, where it could cause damage.

In this connection it is advantageous for the connecting piece to have an extension projecting into a bore in the plastic of the housing, a sealing being arranged between the circumferential wall of the extension and the plastic. Also this sealing works radially. Heavy stress on the plastic caused by screwing in the connecting piece is avoided. Further, an additional solid connection between housing and metal sheet enclosure is created.

Preferably, the connecting piece has a shoulder projecting over the internal diameter of the metal sheet wall, which shoulder is arranged at a distance from the front side of the metal sheet wall. This distance helps avoiding an undesired double fit between parts of the connecting piece and the housing. At the same time, however, the connecting piece also covers the metal sheet wall, that is, protects it against damage caused by inappropriate handling.

In a particularly preferred embodiment the distances between two connecting pieces form a retaining arrangement for a mounting bracket. Thus, the valve can be mounted on a different basis. The mounting bracket can, for example, form the connection between neighbouring connecting pieces or supports.

Advantageously, the metal sheet enclosure is made as a hollow cylinder surrounding the housing in the circumferential direction. The production of the metal sheet enclosure is then relatively inexpensive. Tubes of thin metal sheet, that is, with a wall of thin metal, with the required diameter, are available as semi-finished products. The required length merely has to be cut off such a tube, after which the openings must be made, under simultaneous formation of the metal sheet walls for the individual connections. Finally, the housing, that is the plastic part of the housing, must be inserted in the metal sheet enclosure, and the housing is pressure stable.

Advantageously, the housing is made in two parts in the axial direction, the metal sheet enclosure covering a parting line between the two housing parts. The embodiment with two housing parts involves two advantages. Firstly, it is simpler, when it is only wanted to insert one housing part a limited distance into the metal sheet enclosure. Secondly, it gives more freedom with regard to the embodiment of the inside of the housing, which is particularly vital when fluid channels must be provided in the housing, which do in fact extend in the axial direction, but are not intended to pass through the whole length of the housing. As the metal sheet enclosure covers a parting line between the two housing parts, the risk that the parting line, which is in itself a weak spot, has a negative influence on the stability, is relatively small.

Advantageously, the valve element is formed as a valve slide made of a tube of thin metal sheet. This also makes the production less expensive. In the same way, the valve slide can be made of an inexpensive, available semifinished product.

Preferably, the valve slide is arranged floatingly in the housing. Thus, a fluid-filled opening is formed between the valve slide and the housing, which opening is only interrupted by sealings extending in the circumferential direction. This means that in the circumferential direction the valve slide can be exposed to pressure from all sides. In this case even water can be used as hydraulic fluid.

BRIEF DESCRIPTION OF THE DRAWING

In the following the invention is described on the basis of a preferred embodiment in connection with the drawings, showing.

DESCRIPTION OF THE PREFERRED EMBODIMENT

Figure 1:
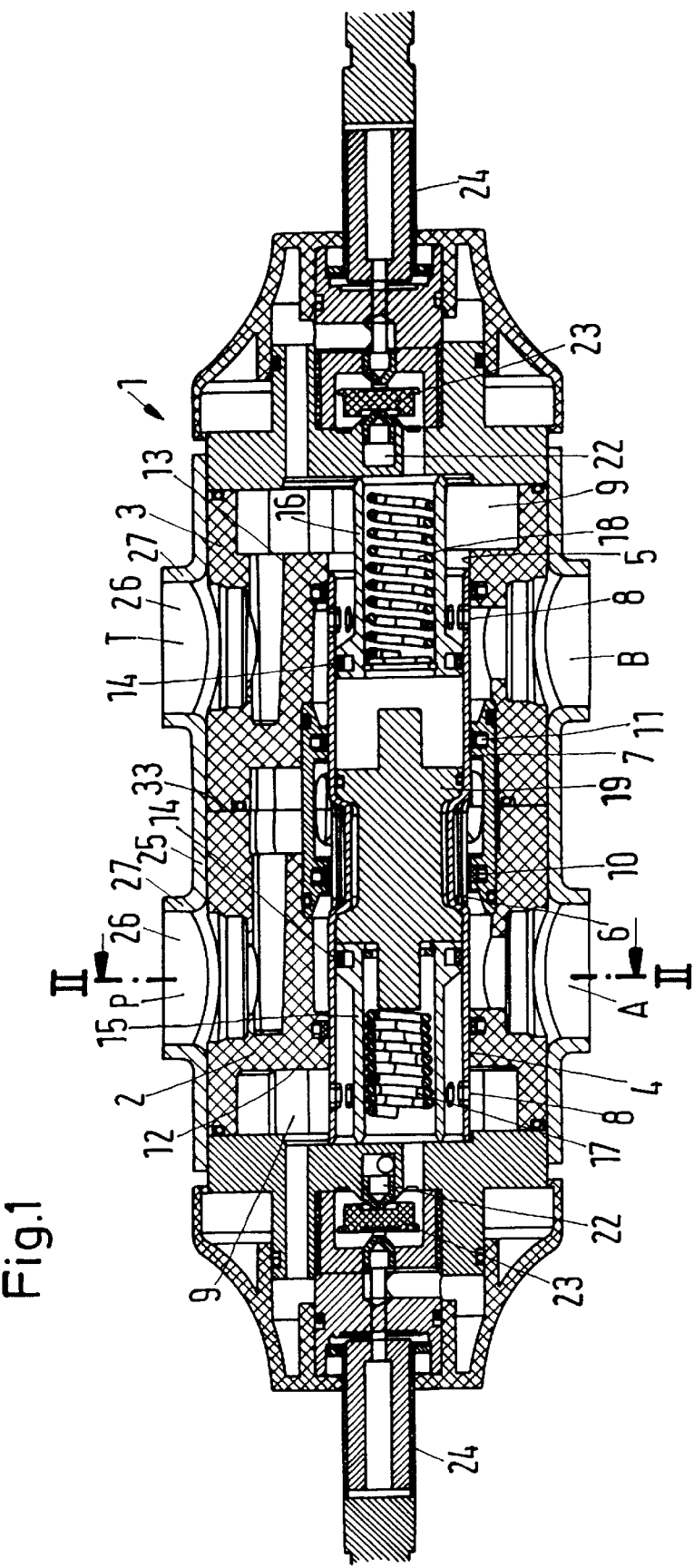
FIG. 1 a schematic longitudinal section through a valve

A valve 1 shown in FIG. 1 is made as slide valve. It has a housing made of two axially neighbouring housing parts 2, 3, in which housing a slide 4 is axially movable in a recess 5.

The housing has a pressure connection P, a tank connection T and two working connections A, B. As shown in FIG. 1, the slide 4 permits the connection of the pressure connection P with the working connection A and the second working connection B with the tank connection T. For this purpose the slide 4 has a constriction 6 with a reduced diameter formed like a circumferential groove. This constriction 6 is made in the axial centre of the slide 4. In the axial centre of the housing a circumferential groove is made in a reinforcement ring 7, which groove is connected with the pressure connection P. In the second working position the connection A is connected with T and B is connected with P. In the neutral position of the slide (axial centre position) the pressure connection P is blocked.

On the axial end of the slide stamped openings 8 are provided, through which the hydraulic fluid from the working connection B can reach the inside of the tubular slide 4. From there the fluid can drain off via the front side to a chamber 9 which is connected with the tank connection. The left chamber 9 is connected with the tank connection T via channels 10, which extend parallel to the axis in the housing (FIG. 2).

In the neutral position of the slide 4 the constriction is arranged completely inside the reinforcement ring 7 and sealed on both sides by sealings 10, 11, so that hydraulic fluid from the pressure connection P cannot penetrate further here. Additional sealings 12, 13 act on the outside of the slide 4, whereas on the inside sealings 14 are provided, which are fixed on spring retainers accommodating return springs 17, 18. In the position of the slide 4 shown in FIG. 1, the return spring 17 provides that the valve slide 4 is returned to its neutral position. In this connection the return springs 17, 18 act upon an insert 19, which is held in the slide 4 by the constriction 6, which is formed through a deformation of the tube making out the slide 4.

Figure 2:
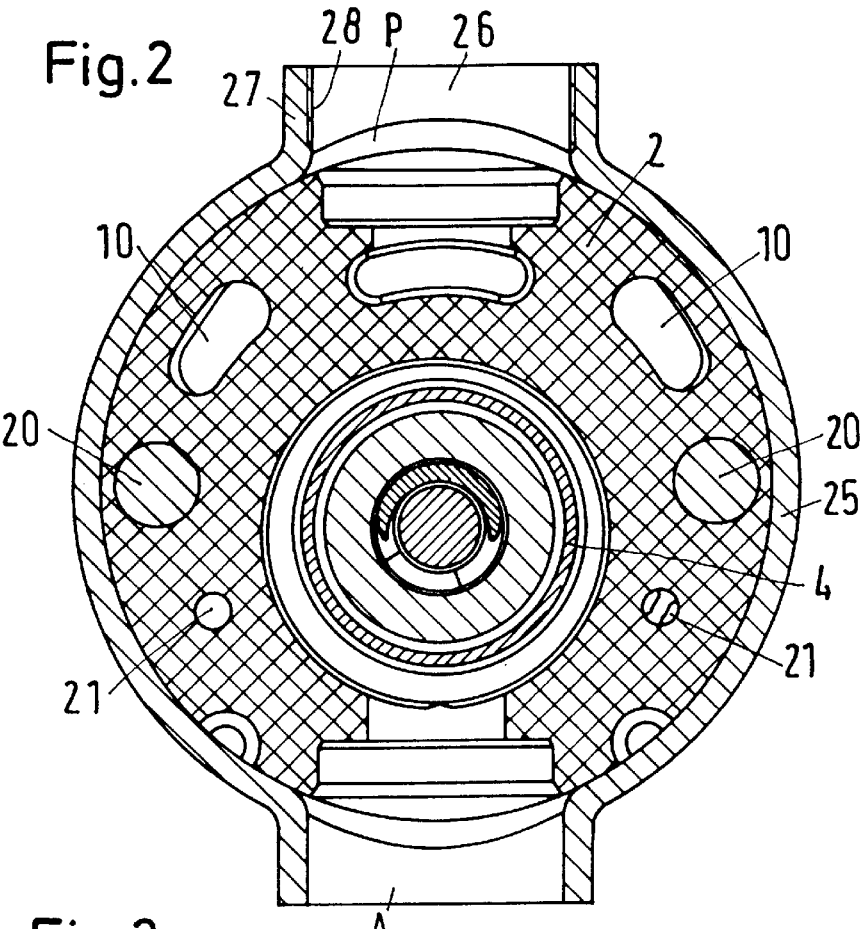
FIG. 2 a section II—II according to FIG. 1

The two housing parts 2, 3 are kept together by axially extending bolts 20 (FIG. 2). Additionally, channels 21 are provided in the housing, which channels connect the pressure connection P with pressure chambers 22, which are closed by closing members 23 of solenoid valves 24. When the closing members 23 are opened, pressure fluid under pressure can reach one front side or the other of the insert 19, to effect a movement of the slide 4.

The housing parts 2, 3 are surrounded by a sheet metal enclosure 25. As appears from FIG. 2, the metal sheet enclosure 25 is made as a cylindrical tube. It covers a parting line 33 between the housing parts 2, 3 and has an opening 26 surrounded by a metal sheet wall 27 for each of the connections P, T, A, B. As can be seen from the enlarged view of FIG. 3, a thread 28 is made on the inside of the metal sheet wall 27. As the metal sheet wall 27 surrounds the opening 26 parallel to its axis, a thread length is available, which corresponds to the height of the metal sheet wall 27. Thus a length can be selected, which permits fitting of a connecting piece 29 with the required holding power. This thread length is substantially longer than the one, which could be reached, when only the thickness of the metal sheet could be used to produce the thread.

Figure 3:
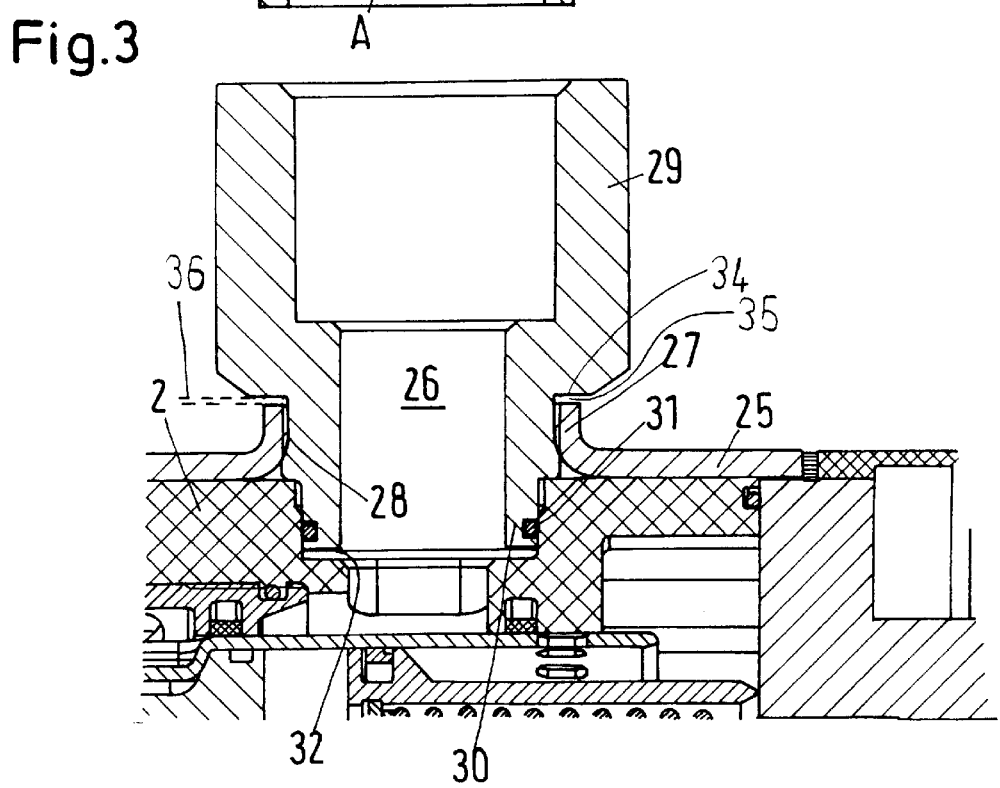
FIG. 3 an enlarged view of a fluid connection

As can be seen particularly from FIG. 3, the metal sheet wall 27 is bent out from the metal sheet enclosure 25. The metal sheet wall 27 thus consists of a part of the material, which should have been removed when making the opening 26. The bending, which is for example made by deep-drawing, gives a one-piece connection between the metal sheet wall 27 and the metal sheet enclosure 25. Thus, the thread 28 is placed in a part, which is fixedly connected with the metal sheet enclosure 25. The metal sheet enclosure 25 stabilises the metal sheet wall in the radial direction, so that the thread is able to withstand considerable forces. The connecting piece 29 can thus be connected to a line being supposed to a correspondingly high pressure.

The connecting piece 29 has a extension 30 projecting through the thread into the plastic of the housing part 2. A sealing 31 surrounds the extension 30 in the circumferential direction, and thus lies in the radial direction between the extension 30 and the housing part 2. The same applies, of course, for the connecting piece 29, which is inserted in the housing part 3.

This fixing of the connecting piece 29 does not only cause a good sealing of the housing parts 2, 3 towards the outside. It also provides that the housing is not excessively loaded by sealing forces. This might be different, if the sealing had been arranged on the front side of the extension 30. As the sealing is arranged immediately between the connecting piece 29 and the housing part 2 or 3, respectively, no fluid can penetrate to the metal sheet enclosure 25. Thus, a sealing in the area of the thread 28 can be avoided. Additionally, fluid is prevented from reaching the metal sheet enclosure 25 and the housing parts 2, 3, where it might, under certain circumstances, cause damage.

Further, the connecting piece 29 provides a fixing of the metal sheet enclosure 25 on the housing 2, 3. The metal sheet enclosure 25 is fitted around the housing parts 2, 3 with a certain stress, so that anyway a displacement of the housing parts 2, 3 is hardly possible. The radial insertion of the extension 30 of the connecting piece 29, however, provides an additional fixing of the housing parts 2, 3 in the metal sheet enclosure 25.

The connecting piece 29 has a shoulder 34 projecting over the internal diameter of the metal sheet wall 27. When the connecting piece 29 has been screwed in, the connecting piece 29 protects the metal sheet wall from being damaged by external parts. The shoulder 34 is, however, arranged at a distance 35 from the front side of the metal sheet wall 27. In this distance 35 it is possible to insert for instance a mounting bracket, shown with dotted lines in FIG. 3. When such a mounting bracket, that is, a component which serves the purpose of fixing the valve to another part, is inserted between two neighbouring connections a relatively stable construction is obtained with which the valve can be held. Of course, fixing on one side of the connecting piece 29 is not the only way of fitting such a mounting bracket 36. It could also have an opening for admission of the connecting piece 29.

A threaded connection between the connecting piece 29 and the metal sheet wall 27 of the metal sheet enclosure 25 is shown. Of course, also other connections can be imagined, particularly undetachable connections such as welding soldering or adhesive bonding. Such an embodiment would particularly be chosen to prevent demounting without damaging. This may be required in certain cases for safety reasons.

The housing parts 2, 3 and also the reinforcement ring 7 could preferably be made of a plastics material with fibre reinforcement. As the valve slide 4 is surrounded by fluid on all sides, there are no friction surfaces, except for the sealings. However, the sealings can be made to perform a low-friction co-operation with the slide. Thus, the valve 1 can also be operated with water as hydraulic fluid.

We claim:

1. Hydraulic valve having a housing made of plastic, and having at least two fluid connections and a valve element arranged to be movable in the housing, the housing being surrounded by a metal sheet enclosure having at each fluid connection an opening which is surrounded by a metal sheet wall projecting from and connected with the metal sheet enclosure.

2. Hydraulic valve according to claim 1, in which the metal sheet wall and the metal sheet enclosure are made in one piece.

3. Hydraulic valve according to claim 2, in which the metal sheet wall is bent from the metal sheet enclosure.

4. Hydraulic valve according to claim 1, in which the metal sheet wall is vertical to the opening.

5. Hydraulic valve according to claim 4, in which the metal sheet wall is threaded.

6. Hydraulic valve according to claim 5, in which the thread is made as an internal thread.

7. Hydraulic valve according to claim 1, including a connecting piece connected with the metal sheet wall, the connecting piece being sealed directly with the plastic of the housing.

8. Hydraulic valve according to claim 7, in which the connecting piece has an extension projecting into a bore in the plastic of the housing, a sealing being arranged between a circumferential wall of the extension and the plastic.

9. Hydraulic valve according to claim 7, in which the connecting piece has a shoulder projecting over the metal sheet wall, which shoulder is spaced at a distance from the metal sheet wall.

10. Hydraulic valve according to claim 9, in which the distances between two connecting pieces form a retaining arrangement for a mounting bracket.

11. Hydraulic valve according to claim 1, in which the metal sheet enclosure comprises a hollow cylinder surrounding the housing in the circumferential direction.

12. Hydraulic valve according to claim 1, in which the housing comprises two parts in the axial direction, the metal sheet enclosure covering a parting line between the two housing parts.

13. Hydraulic valve according to claim 1, in which the valve element is formed as a valve slide made of a tube of thin metal sheet.

14. Hydraulic valve according to claim 13, in which the valve slide is arranged floatingly in the housing.

* * * * *